United States Patent [19]

Slaughter

[11] 4,333,216
[45] Jun. 8, 1982

[54] METHOD FOR MANUFACTURING A SANDWICH PANEL STRUCTURE

[75] Inventor: Edward R. Slaughter, Palm Beach Shores, Fla.

[73] Assignee: United Technologies Corporation, Hartford, Conn.

[21] Appl. No.: 246,757

[22] Filed: Mar. 23, 1981

[51] Int. Cl.³ .............................................. B23P 17/00
[52] U.S. Cl. .................................... 29/157 R; 29/423;
29/455 LM; 29/457; 29/157.3 D; 156/264;
156/290; 156/155; 228/235
[58] Field of Search ................. 156/81, 155, 197, 219,
156/220, 221, 222, 264, 288, 290; 29/423, 455
R, 455 LM, 457; 431/352, 353; 228/235

[56] References Cited

U.S. PATENT DOCUMENTS

| | | | |
|---|---|---|---|
| 3,044,160 | 7/1962 | Jaffee | 29/423 |
| 3,545,202 | 12/1970 | Batt et al. | 431/352 |
| 3,706,203 | 12/1972 | Goldberg et al. | 431/353 |
| 3,762,025 | 10/1973 | Guttlieb et al. | 29/423 |
| 4,020,542 | 5/1977 | Slaughter | 29/155 R |
| 4,065,046 | 12/1977 | Roberts et al. | 156/155 |
| 4,130,452 | 12/1978 | Indri, Jr. | 156/155 |

Primary Examiner—Caleb Weston
Attorney, Agent, or Firm—Robert C. Walker

[57] ABSTRACT

A method for manufacturing sandwich panels of the type in which a pair of facing sheets 12 are separated by a multiplicity of pins 14 is disclosed. Concepts and techniques for fabricating the structure in a leachable matrix are discussed. Selective roll bonding and cutting are employed to form pins of accurate dimension contour and spacing.

1 Claim, 12 Drawing Figures

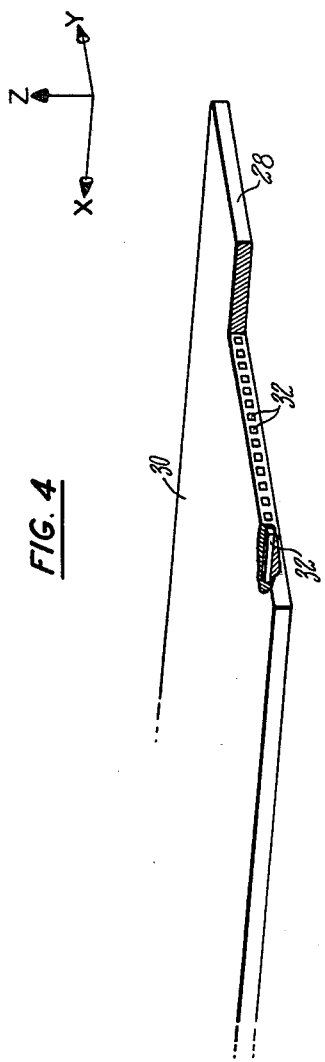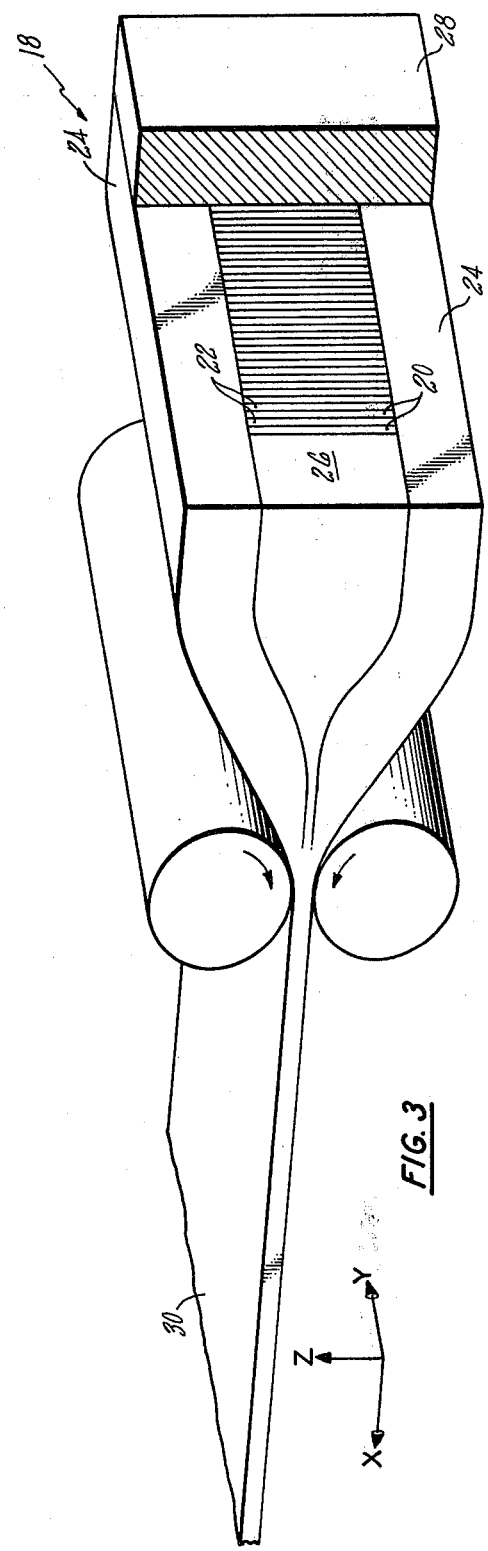

METHOD FOR MANUFACTURING A SANDWICH PANEL STRUCTURE

TECHNICAL FIELD

This invention relates to the fabrication of sandwich panel structures, and more particularly to structures having a pair of opposing sheets separated by a multiplicity of pins.

The concepts were developed in the gas turbine engine industry for use in the fabrication of combustion chamber liners, but have wider applicability to other structures and uses as well.

BACKGROUND

U.S. Pat. No. 3,545,202 to Batt et al. entitled "Wall Structure and Combustion Holes for a Gas Turbine Engine" and U.S. Pat. No. 3,706,203 to Goldberg et al. entitled "Wall Structure for Gas Turbine Engine" are representative of the use of convectively cooled panels in gas turbine combustion chambers. The panels confine high temperature combustion products to a defined space within the engine. Temperatures within the defined space may reach levels on the order of three thousand five hundred degrees Fahrenheit (3500° F.) or higher. Cooling air is flowable between ribs of the panels to prevent deterioration of the material from which the panels are constructed.

Although the structure of such ribbed panels appears relatively simple, the fabrication thereof and molding the panels into useful shapes is often difficult. One technique for fabricating ribbed panel sheet stock is set forth in my U.S. Pat. No. 4,020,542 entitled "Sandwich Panel Fabrication", now of common assignee herewith. By the fabrication technique which I have disclosed therein, alternating sheets of rib and core material are roll bonded together and sliced to form the rib section of a panel. Top and bottom sheets of facing material are bonded to opposing sides of the rib section and the core material is subsequently leached therefrom to form the ribbed sandwich panel.

As is illustrated by the referenced patents, Batt et al and Goldberg, flat panel stock is typically rolled to a cylindrical geometry for use. Slight conical geometries are also employed. Inherent stiffness of the ribbed panels inhibits forming, particularly in the longitudinal direction of the ribs. Forming difficulties may ultimately limit the use of such panels.

Panels having increased suitability to forming and methods for manufacture thereof are sought by scientists and engineers in the industry.

DISCLOSURE OF INVENTION

According to the present invention, sandwich, panel structures formed of opposing parallel sheets separated by pins are fabricated by a roll bonding technique through which the pins are sized, shaped and spaced within a leachable metallic matrix material.

In accordance with a detailed method of fabricating pinned sandwich panel structures, alternating strips of pin material and matrix material are encased in a sheath of material having the same composition as the matrix material and rolled to form composite sheets of matrix material having parallel bars of pin material embedded therein; a plurality of composite sheets with embedded bars of pin material are stacked one on top of another with the bars of pin material in each sheet being in parallel alignment with the bars of pin material of the adjacent sheets; the stacked composite sheets are rolled to form an elongated composite structure or billet in which several rows of pin material bars extend across the billet in ribbon-like fashion; slices are cut from the composite structure perpendicularly across the rows of bars of pin material; facing sheets of material from which the sandwich panel is to be constructed are bonded to the ends of the composite slice, specifically to opposing ends of each bar of pin material within the composite slice; and the matrix material is leached from between the pins to form a sandwich panel structure in which the opposing sheets are joined to and spaced apart by the formed pins.

Primary features of the present invention are the successive rolling steps by which the pins are formed to accurate dimension, contour and spacing. The pins are formed by rolling techniques within a matrix material. Opposing sheets of the sandwich panel are bonded to the formed pins. The matrix material is subsequently leached from the resulting structure to produce the end product panel.

A principal advantage of the present invention is an ability to produce low cost sandwich panels of pin-type construction. Accurate spacing and dimensioning of the pins is achieved by the rolling process through control of thickness reduction ratios. The structure produced is well suited to subsequent forming steps in the manufacture of articles from constructed panels. Pin-type sandwich panels have particular utility as combustion liners of gas turbine engines.

The foregoing and other objects, features and advantages of the present invention will become more apparent in the light of the following detailed description of the preferred embodiment thereof as shown in the accompanying drawing.

BRIEF DESCRIPTION OF DRAWINGS

FIG. 3 is an illustration of the first rolling step;

FIG. 4 is a perspective view of the product of the FIG. 3 rolling step including a cutaway portion showing pin material which will ultimately be cut and formed into pins of the sandwich panel;

BEST MODE FOR CARRYING OUT THE INVENTION

Figure 1:
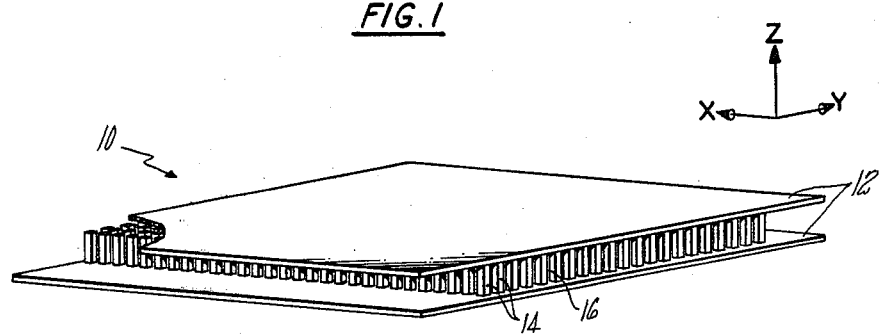
FIG. 1 is a perspective view of a sandwich panel constructed in accordance with the concepts of the present invention.

The concepts of the present invention are directed to the manufacture of a sandwich panel in which end plates of the panel are separated by a multiplicity of pins. Such a panel 10 is illustrated in FIG. 1 and includes a pair of end plates or facing sheets 12 separated by a multiplicity of pins 14. The panel is well suited to industrial applications requiring a convectively cooled wall and, therein, a cooling fluid is flowed over the pins 14 in the space 16 between end plates.

The manufacture of such a structure by the present invention employs a series of roll bonding steps in which pins of accurate dimension and spacing are formed. For purposes of illustration and discussion, the desired pins in an exemplary embodiment have a square cross section geometry and are twenty thousands (0.020) of an inch on each side. The pins are spaced forty thousandths (0.040) of an inch on centers in each direction. The height of each pin is approximately one hundred thousandths (0.100) of an inch. The thickness of the end plates 12 is approximately twenty thousandths (0.020) of an inch. The roll bonding steps are related in principle to those discussed in my U.S. Pat. No. 4,020,542 entitled "Sandwich Panel Fabrication". FIGS. 2-12 illustrate the pin-panel fabrication technique. The x-y-z axes are indicated in each Figure to maintain clarity and continuity throughout the drawings.

The roll bonding steps are conducted in an oxygen-free environment, such as in an evacuated, hermetically sealed container of heat resistant material. The steps are carried out in the hot working range of temperature of the panel material under conditions ensuring essentially planar strain conditions during bonding. Multiple rolling steps are employed to achieve each reduction.

Figure 2:
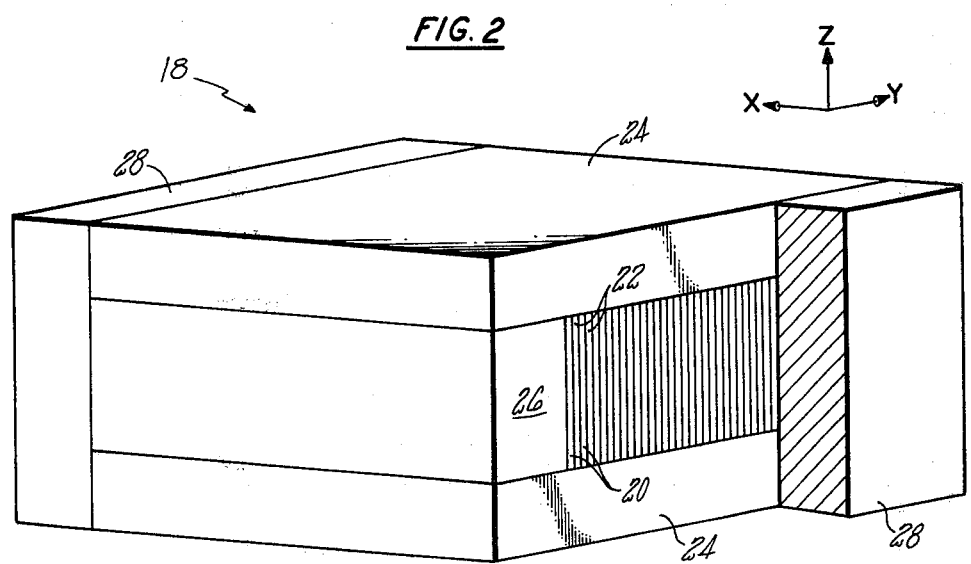
FIG. 2 is a perspective view of the assemblage of starting strips which will ultimately be formed into the FIG. 1 configuration.

A starting assemblage 18 from which the sandwich panel of FIG. 1 is to be fabricated is shown in FIG. 2. Were the panel to be fabricated of high temperature capability material, such as Hastelloy X (a commercially available nickel base alloy from which combustion chambers of gas turbine engines are typically fabricated), strips 20 of Hastelloy X material are disposed alternatingly with strips 22 of matrix material, such as carbon steel. The alternating strips are encased on the top and bottom by plates 24 of the matrix material and on the sides by bars 26 of the same matrix material. End bars 28 cover the ends of the strips 20 and 22. The plates 24 and bars 26,28 are preferably welded to each other to form a sealed container for oxidation protection. Each of the strips 20 and 22 is approximately twenty thousandths (0.020) of an inch thick. Each of the plates 24 has a thickness which is slightly more than one-half the width (z-dimension) of the strips 20 and 22. The height (z-dimension) of the strips 20 and 22 may, for example, be five hundred thousandths (0.500) of an inch and the corresponding thickness (z-dimension) of the plates 24 is slightly greater than two hundred fifty thousandths (0.250) of an inch. The length (x-dimension) may be any convenient size. The number of strips 20 and 22 should be, for economy, the greatest number which can fit laterally across the rolling mill to be employed.

Panels fabricated of a variety of alloys can be produced by this invention. For each panel material, a suitable matrix material must be provided. The matrix material must have its hot working range overlapping the hot working range of the panel material so that the bonding operations can be carried out at a temperature within the hot working range of both materials. The matrix material must be soluble in a solution that produces virtually no attack on the panel and the matrix alloy must not contaminate the panel with fast diffusing impurity species that seriously degrade the properties of the panel material.

The initial roll bonding step is illustrated schematically in FIG. 3. The assemblage 18 is rolled in the x-direction across a rolling plane xy to form a composite sheet 30 containing parallel bars 32 of pin material. Multiple rolling steps are employed to achieve a reduction ratio of twenty-five to one (25:1) in the z-dimension. The height (z-dimension) of the strips 20 is reduced from a strip 20 height of five hundred thousandths (0.500) of an inch to a bar 32 height of twenty thousandths (0.020). The composite sheet 30 containing the parallel bars 32 embedded therein is illustrated in FIG. 4.

Figure 5:
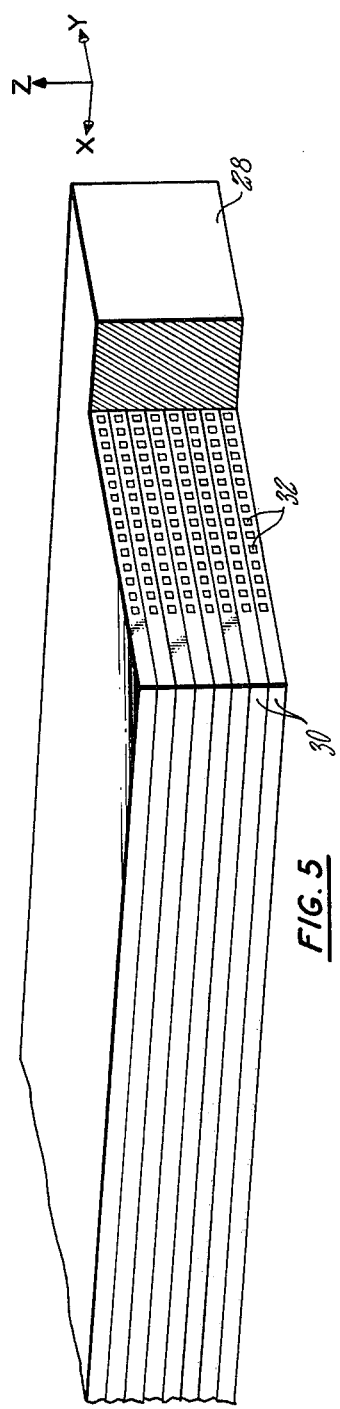
FIG. 5 is a perspective view of a portion of a stack of FIG. 4 product.

As represented by FIG. 5, a plurality of the composite sheets 30 are cleaned of oxidation and are stacked one on top of another with the bars 32 in parallel alignment extending in the x-direction. The stacked sheets are rolled at FIG. 6 in the x-direction across a rolling plane xy to form a composite billet 34 containing parallel rows 36 of pin material ribbons 38 extending in the x-direction across the billet. Multiple rolling steps may be employed to achieve a reduction ratio of three to one (3:1) in the z-dimension. The height (z-dimension) of the bars 30 is reduced from a bar height of twenty thousandths (0.020) to a ribbon 38 height of sixty-six ten thousandths (0.0066) of the ribbons 38.

Figure 6:
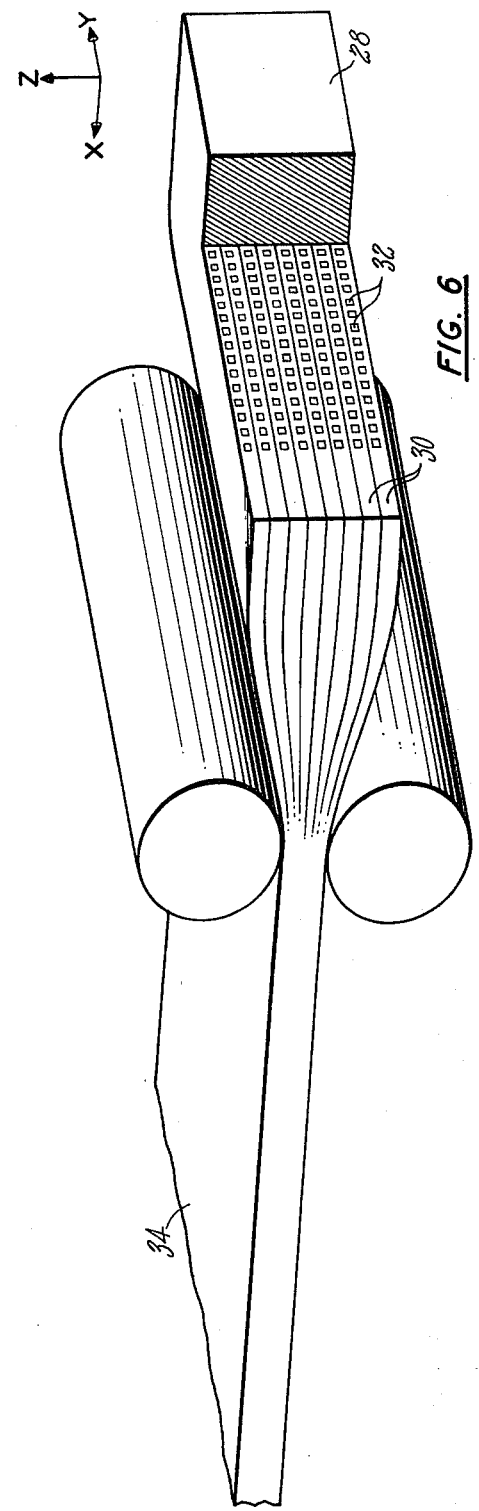
FIG. 6 is an illustration of the second rolling step operating on the FIG. 5 stack.
Figure 7:
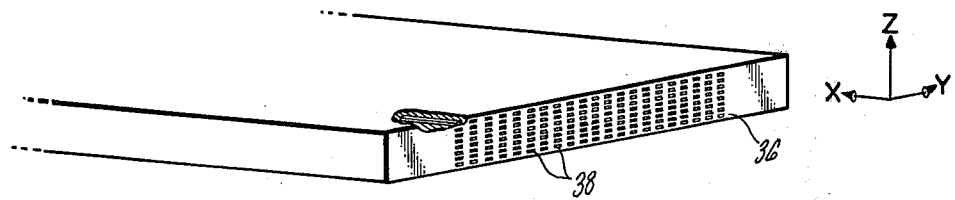
FIG. 7 is a perspective view of the product of the FIG. 6 rolling step including a cutaway portion showing pin material which will ultimately be cut and formed into pins of the sandwich panel.
Figure 8:
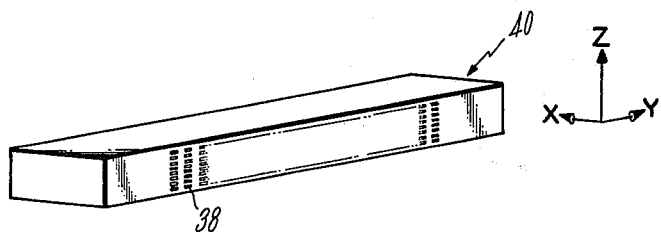
FIG. 8 is a perspective view of a y-z plane slice taken from the FIG. 7 product.

In FIG. 8 a y-z plane slice 40 is cut from the FIG. 7 product of the FIG. 6 rolling operation. The slice 40 has a thickness (x-dimension) of three hundred thousandths (0.300) of an inch. Ribbons 38 of pin material each having a height (z-dimension) of sixty-six ten thousandths (0.0066) of an inch and a width (y-dimension) of twenty thousandths (0.020) of an inch extend fully across the thickness of the slice.

Figure 9:
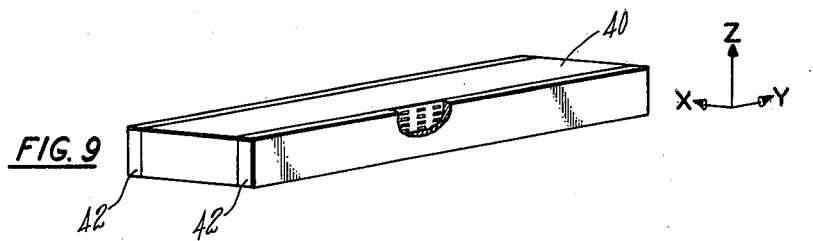
FIG. 9 is a perspective view of the FIG. 8 slice with end plates of the sandwich panel adhered thereto.
Figure 10:
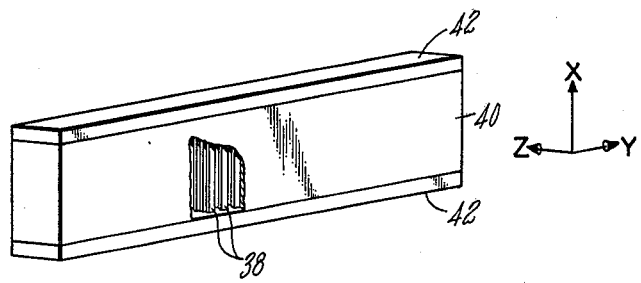
FIG. 10 is a rotated perspective view of the FIG. 9 slice with end plates.

In FIG. 9, end plates 42 of high temperature capability material, preferably of the same material from which the pins are being fabricated, or face sheets, are placed one on each end of the slice 40. A plurality of slices 40 may be employed. The slice and end plates are rotated ninety degrees (90°) about the y-axis to the position shown in FIG. 10.

Figure 12:
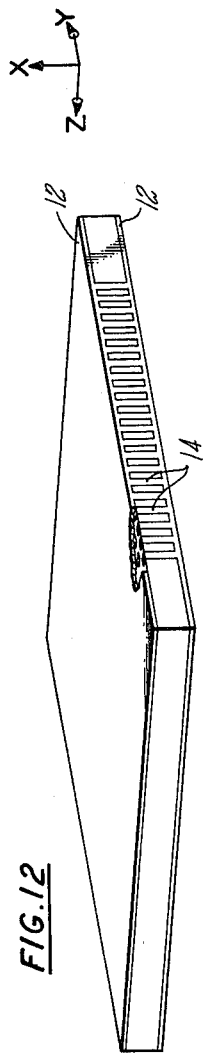
FIG. 12 is a perspective view of the product of the FIG. 11 rolling step including a cutaway portion showing the pins at final dimension and spacing, but still contained within the matrix material.
Figure 11:
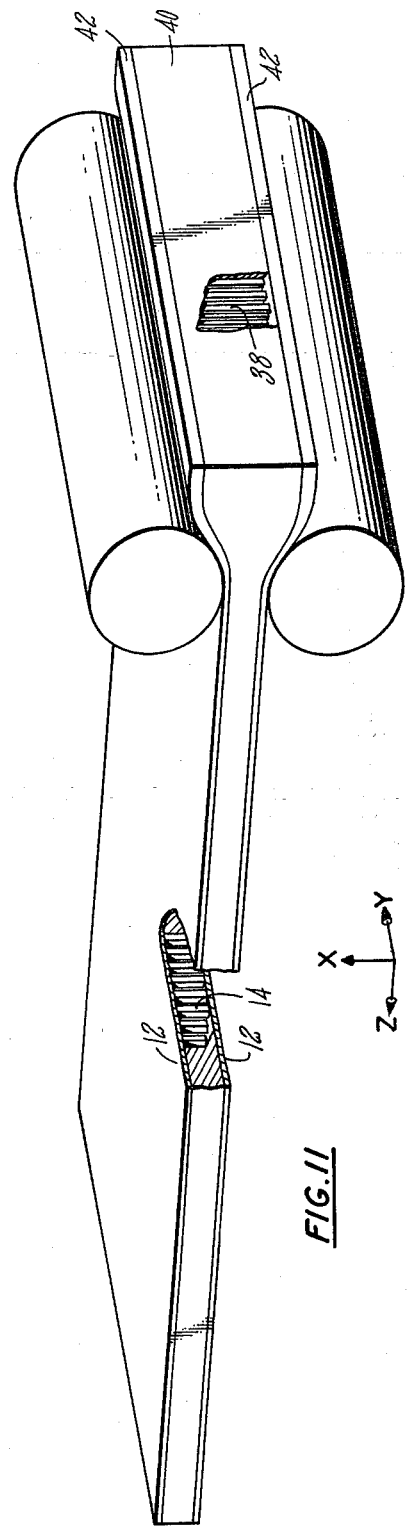
FIG. 11 is an illustration of the third rolling step operative on the FIG. 10 slice with end plates.

In FIG. 11, the slice 40 with face sheets 42 is rolled in the z-direction across a rolling plane to form the sandwich panel and pins to the desired size, shape and spacing. Multiple rolling steps may be employed to achieve a reduction ratio of three to one (3:1) in the x-dimension. The height (x-dimension) of the ribbons 38 is reduced from a ribbon 38 height of three hundred thousandths (0.300) of an inch to a pin 14 height of one hundred thousandths (0.100) of an inch. The length (z-dimension) of the pins 14 is increased from sixty-six ten thousandths (0.0066) of an inch to twenty thousandths (0.020) of an inch. The width (y-dimension) of the pins 14 remains constant at twenty thousandths (0.020) of an inch. Such a configuration is shown in FIG. 12.

In a final step the carbon steel matrix material is leached from the pin and end plate structure of high temperature capability material leaving the desired sandwich panel pictured in FIG. 1 in which end plates 12 are separated by a multiplicity of pins 14. A leaching solution suitable for use with the materials described herein consists of thirty to fifty percent (30-50%) by volume of concentrated nitric acid in water at one hundred eighty degrees Fahrenheit (180° F.).

Each of the pins constructed in accordance with the sequence delineated above, has a twenty thousandths (0.020) of an inch by twenty thousandths (0.020) of an inch square cross sectional geometry. The pins are spaced on centers forty thousandths (0.040) of an inch apart.

Although the invention has been shown and described with respect to preferred embodiments thereof, it should be understood by those skilled in the art that various changes and omissions in the form and detail thereof may be made therein without departing from the spirit and the scope of the invention.

What is claimed is:

1. A method for manufacturing a sandwich panel consisting of a pair of opposing sheets separated by a multiplicity of pins, wherein the method comprises:
    assembling alternating strips of material from which the pins are to be fabricated and a leachable matrix material;
    encasing the assemblage of alternating strips in a sheath of matrix material;
    rolling the encased assemblage in the longitudinal direction of the alternating strips to bond the strips into a composite sheet containing parallel bars of pin material;
    stacking a plurality of composite sheets one upon the other with the bars of pin material in parallel alignment;
    rolling the stacked composite sheets in the longitudinal direction of the bars of pin material to bond the sheets in a composite billet containing multiple rows of ribbons of pin material;
    cutting a material slice from the composite billet in a direction perpendicular to longitudinal direction of the ribbons of pin material to form a slice of said composite billet in which a multiplicity of pin material ribbons extend across the slice;
    placing a facing sheet of material from which the sandwich panel is to be constructed on each side of the composite slice in contact with opposite ends of the pin material extending across the slice;
    rolling the facing sheets and composite slice to bond the sheets and pin material embedded in the slice one to another and to form pins of the desired end shape and dimension; and
    leaching the matrix material from between the pins to form a sandwich panel in which the pair of opposing face sheets are separated by a multiplicity of spaced pins.

* * * * *